US007231231B2

(12) United States Patent
Kokko et al.

(10) Patent No.: US 7,231,231 B2
(45) Date of Patent: Jun. 12, 2007

(54) METHOD AND APPARATUS FOR LOCKING A MOBILE TELEPHONE TOUCH SCREEN

(75) Inventors: Petri Kokko, Oulu (FI); Markku Autio, Oulu (FI)

(73) Assignee: Nokia Corporation, Espoo (FI)

(*) Notice: Subject to any disclaimer, the term of this patent is extended or adjusted under 35 U.S.C. 154(b) by 644 days.

(21) Appl. No.: 10/686,509

(22) Filed: Oct. 14, 2003

(65) Prior Publication Data
US 2005/0079896 A1    Apr. 14, 2005

(51) Int. Cl.
  *H04B 1/38* (2006.01)
  *H04M 1/00* (2006.01)
(52) U.S. Cl. .............. 455/566; 455/550.1; 455/556.2; 345/173; 345/104
(58) Field of Classification Search ............ 455/550.1, 455/556.2, 566; 345/173–175, 104
See application file for complete search history.

(56) References Cited
U.S. PATENT DOCUMENTS
2004/0085351 A1* 5/2004 Tokkonen ............... 345/741

2005/0253817 A1* 11/2005 Rytivaara et al. ........... 345/173
2006/0012577 A1* 1/2006 Kyrola ........................ 345/173
2006/0117197 A1* 6/2006 Nurmi ......................... 713/323

FOREIGN PATENT DOCUMENTS

| EP | 1284450 A2 | * | 2/2003 |
| GB | 453089 A2 | * | 3/1991 |
| JP | 08171442 | * | 7/1996 |
| JP | 11203045 | * | 7/1999 |
| JP | 2003058302 | * | 2/2003 |

* cited by examiner

*Primary Examiner*—Matthew Anderson
*Assistant Examiner*—Sujatha Sharma
(74) *Attorney, Agent, or Firm*—Ware, Fressola, Van Der Sluys & Adolphson

(57) ABSTRACT

A mobile phone having a touch screen display includes a touch screen lock which is activated during an ongoing call by contacting the touch screen a first time and pressing again within a predetermined time duration interval the touch screen lock remains active during subsequent pressing contacts. The touch screen lock is deactivated during an ongoing call in the absence of pressing contact with the touch screen surface for a time duration interval greater than or equal to a predetermined time duration interval.

10 Claims, 6 Drawing Sheets

METHOD AND APPARATUS FOR LOCKING A MOBILE TELEPHONE TOUCH SCREEN

TECHNICAL FIELD

The present invention relates generally to mobile telephones such as cellular telephones with touch screen displays and deals more particularly with locking and unlocking the touch screen display during an ongoing call to prevent accidental or unintentional operation.

BACKGROUND OF THE INVENTION

Touch screens are well known in the art to provide a means for displaying graphics and text in electronic devices and to provide a user interface means to enter commands to control the device or to perform various other functions to carry out the operation of the device. Touch screens are now becoming increasingly popular for use as displays in mobile telephones, particularly cellular telephones having integrated PDA (personal digital assistant) features and other phone operation related features. The touch screen may be of any suitable type to carry out the intended function, for example, resistive touch screens such as film-on-glass or other touch screen technology now known or future developed. The touch screens, which may also be in color, are generally designed to operate and respond to a finger touch, a stylus tap or movement on the touch screen surface. Touch screens may be used in addition to, in combination with or in place of physical keys traditionally used in a cellular phone to carry out the phone functions and features. Touching or tapping a specific point on the touch screen display will activate a virtual button, feature or function found or shown at that location on the touch screen display. Typical phone features which may be operated by touching or tapping the touch screen display include entering a telephone number, for example, by tapping or touching virtual keys of a virtual keyboard shown on the display, making a call or ending a call, bringing up, adding to or editing and navigating through an address book, and other phone functions such as text messaging, wireless connection to the global computer network and other phone functions now known or future developed.

Cellular telephones, may also be used with touch screen displays. The virtual keys on touch screen are finger operated to control the phone and to carry out various desired phone functions, for example, increasing or decreasing the listening volume, starting or ending a call, accessing speed dialing, or other various features.

One problem generally associated with the use of touch screen displays in mobile telephones, particularly cellular telephones, in which call progression or invoking and activating phone features by touching or pressing the touch screen display at specific locations is the susceptibility to accidental or unintentional activation or deactivation of phone functions such as, for example, accidentally ending a call during the course of the ongoing call due to the user touching the display screen when the phone is held in the talking position or is carried when used with a headset. The design of a cellular phone also lends itself to "one-handed" operation.

It is an object of the present invention therefore to provide means to easily activate and deactivate the touch screen of the cellular phone to prevent accidental or unintentional operation during an ongoing call.

It is a further object of the present invention to provide a touch screen lock that has an active mode to lock the touch screen from operation and a deactivated mode to make the touch screen active for operation.

It is a yet further object of the invention to provide means to alert the user that the touch screen lock is in an active state or a deactivated state.

It is a still further object of the present invention to solve the aforementioned problems and provide an apparatus and method in a touch screen mobile phone for activating and deactivating the touch screen of the mobile phone by pressing on the touch screen surface to cause the touch screen lock to be in an active state or deactivated state to prevent accidental or unintentional operation or allow phone feature operation during an ongoing call.

SUMMARY OF THE INVENTION

In accordance with a first embodiment of the invention, a mobile phone having a touch screen display is characterized by: means defining a touch screen lock; means for activating the touch screen lock during an ongoing call and means for deactivating the touch screen lock during an ongoing call.

Preferably, means for alerting a user that the touch screen lock is activated or deactivated is provided.

Preferably, the user alerting means is further characterized by a message indicating the touch screen lock is in an activated mode.

Preferably, the user alerting means is further characterized in that a closed lock icon is shown on the touch screen display indicating that the touch screen lock is in an activated mode.

Preferably, the user alerting means is further characterized by a message indicating the touch screen lock is in a deactivated mode.

Preferably, the user alerting means is further characterized in that an open lock icon is shown on the touch screen display indicating that the touch screen lock is in a deactivated mode.

Preferably, means for detecting and responding to a first pressing contact on the touch screen display surface being greater than a first predetermined time duration interval is provided whereby the touch screen lock is in a locked state.

Preferably, the first pressing contact is detected during an ongoing call.

Preferably, the touch screen lock is deactivated by the absence of a pressing contact being detected within a second predetermined time duration interval from the end of the first pressing contact.

Preferably, means for detecting and responding to the absence of a pressing contact on the touch screen display surface within a time duration greater than a third predetermined time duration interval from a last detected pressing contact is provided whereby the touch screen lock is in an opened state.

In a second embodiment of the invention, a method for activating and deactivating a touch screen lock in a mobile phone during an ongoing call includes detecting contact with the surface of the touch screen and activating the touch screen lock in response to the touch screen surface contact duration interval being equal to or greater than a first predetermined time duration interval. The touch screen is locked in response to the touch screen lock being activated.

Preferably, the method includes the step of deactivating the touch screen lock and activating the touch screen in the absence of contact with the touch screen surface within a second predetermined time duration interval.

Preferably, the method includes the step of detecting contact with the surface of the touch screen within a second predetermined time duration interval, and maintaining the touch screen lock in an activated mode in response to the detection of contact with the touch screen surface during the second predetermined duration time duration interval.

BRIEF DESCRIPTION OF THE DRAWINGS

These and other objects and features of the present invention will become readily apparent from the following description taken in conjunction with the preferred embodiments thereof with reference to the accompanying drawings in which.

DESCRIPTION OF PREFERRED EMBODIMENTS

Figure 1:
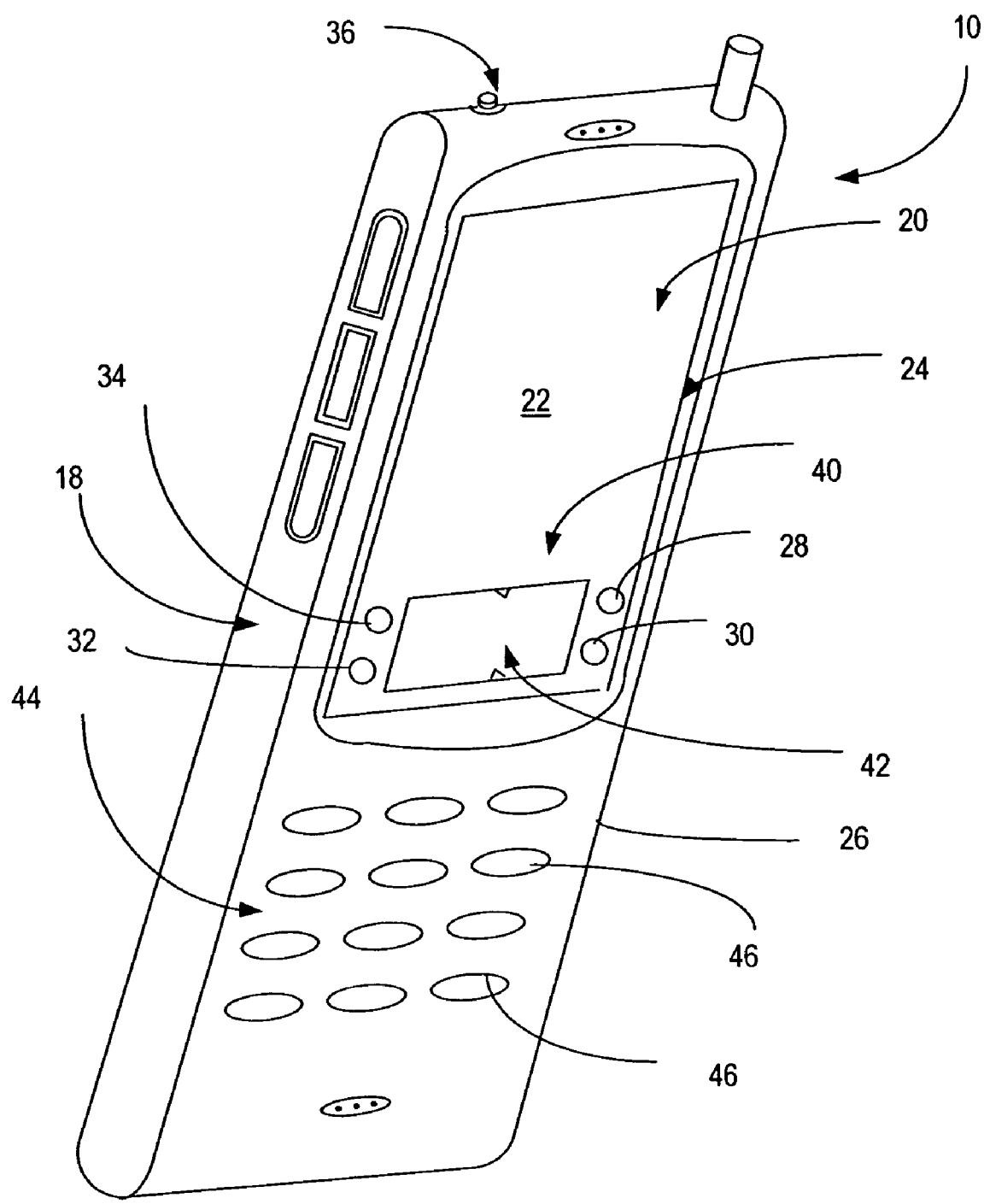
FIG. 1 is a schematic perspective view of a touch screen mobile phone embodying the present invention.

Turning now to the drawings and considering the invention in further detail, a schematic perspective view of a touch screen mobile phone embodying the present invention is illustrated in FIG. 1 and generally designated 10. The touch screen mobile phone 10 includes a touch sensitive display screen generally designated 20 which has a surface 22 appearing in the window area generally designated 24 of the mobile phone case 26. In the illustrated embodiment, PDA (personal digital assistant) functions are selectable by tapping or touching the PDA icon 28, 30, 32, 34 by means of a stylus generally designated 36 carried in the case 26. The stylus may be of any suitable type and design to carry out the intended function. The PDA functions such as calendar, address book, are selected and operate in a manner well known to those skilled in the art and one conventional format such as found in a "PALM PILOT™" handheld PDA is shown generally as 40 on the display screen surface 22 and includes a writing area generally designated 42. The touch screen mobile phone 10 can also include a keypad generally designated 44 and keys 46, 46 which operate in a conventional well known manner. The user can operate the desired phone functions and PDA functions available with the touch screen mobile phone 10 by contacting the surface 22 of the touch sensitive display screen 20 also during the course of an ongoing call. Obviously, it is desired that accidental or inadvertent operation of phone features or functions and PDA functions during an ongoing call are avoided in accordance with the present invention as explained in further detail hereinbelow.

Figure 2:
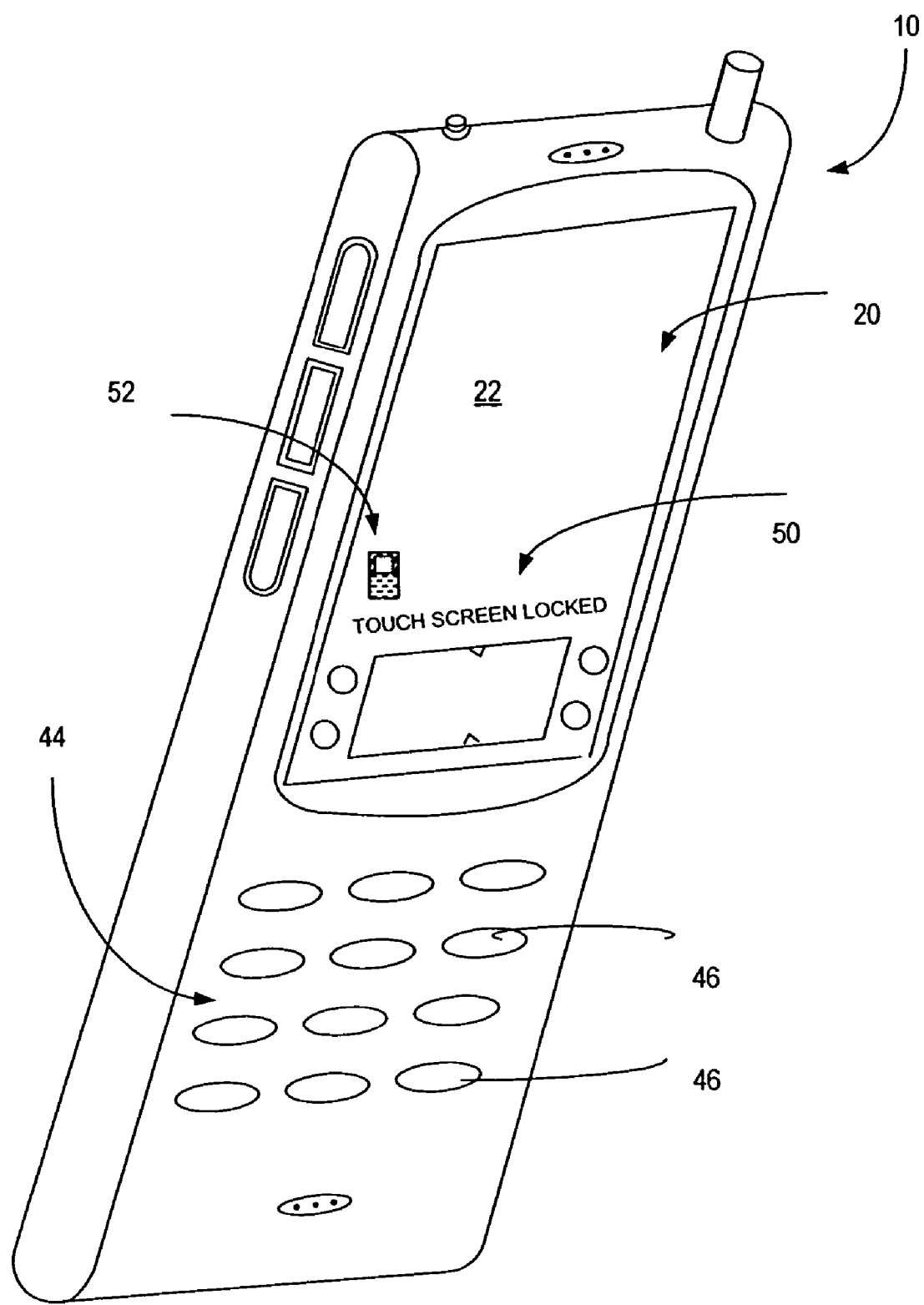
FIG. 2 shows the mobile phone of FIG. 1 as it may appear with a message alerting the user that the touch screen is locked.

Referring now to FIG. 2, the mobile phone of FIG. 1 is illustrated therein as it may appear with a text message alerting the user that the touch screen is locked and the touch screen keypad lock is activated. The text message "TOUCH SCREEN LOCKED" 50 is shown on the touch sensitive display screen 20 to alert the user that contact with the surface 22 of the touch screen 20 will not activate any of the device functions or features available by contacting the surface 22. A closed lock icon generally designated 52 is also shown on the touch sensitive display screen 20 to alert the user that the touch screen and keypad lock is activated.

Figure 3:
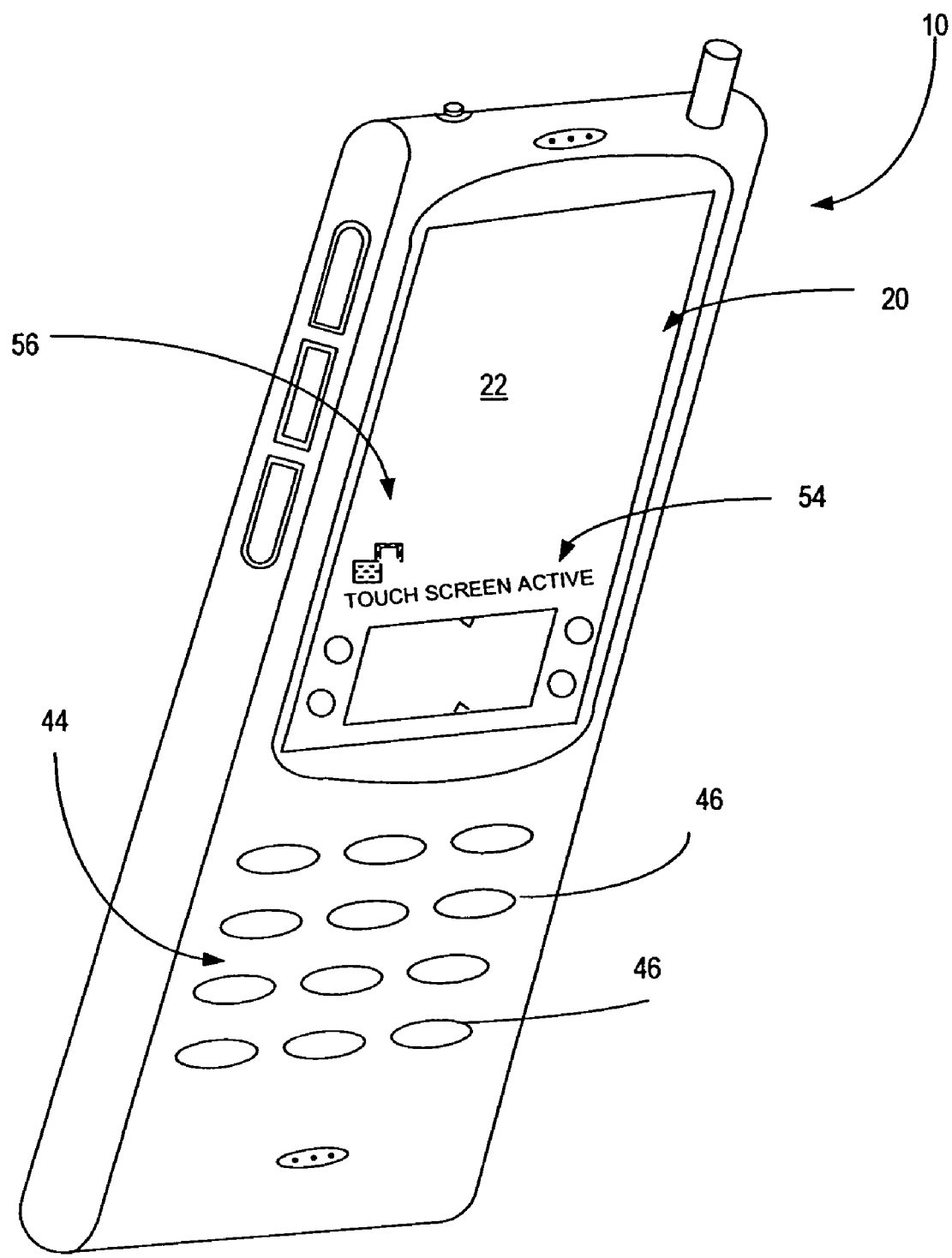
FIG. 3 shows the mobile phone of FIG. 1 as it may appear with a message alerting the user that the touch screen is active.

Now referring to FIG. 3, the mobile phone of FIG. 1 is illustrated therein as it may appear with a text message alerting the user that the touch screen is active and the touch screen and keypad lock is deactivated. The text message "TOUCH SCREEN ACTIVE" 54 is shown on the touch sensitive display screen 20 to alert the user that contact with the surface 22 of the touch sensitive display screen 20 may activate a device feature or function. An unlocked lock icon 56 is also shown on the touch sensitive display screen 20 to alert the user that the touch screen and keypad lock is deactivated, that is, operation of the keys 46, 46 of the keypad 44, or contact with the surface 22 of the display screen 20 are operative to initiate device functions and features available in the mobile phone.

Figure 4:
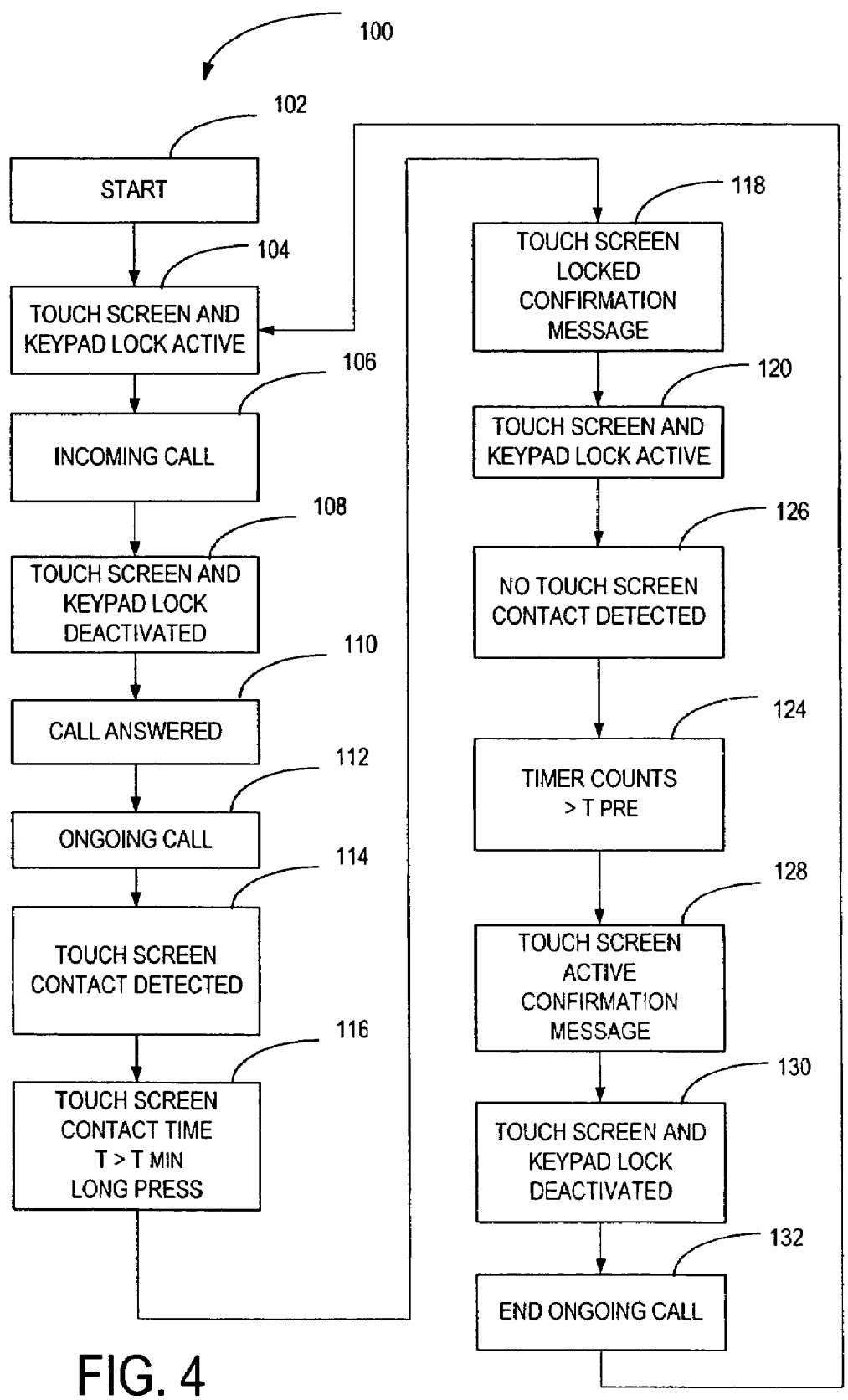
FIG. 4 is a flowchart showing one sequence of the method of the present invention for activating and deactivating the touch screen lock during an ongoing call.

Turning now to FIG. 4, a flowchart showing one sequence of the method of the present invention for activating and deactivating the touch screen and keypad lock during an ongoing call is illustrated therein and generally designated 100. The method begins with the start step 102 and the mobile phone is conditioned such that the touch screen and keypad lock is active as illustrated in step 104. Upon receipt of an incoming call as illustrated in step 106, the touch screen and keypad lock is deactivated as illustrated in step 108 in order to condition the mobile phone to answer the call as illustrated in step 110. Upon answering the call an ongoing call is established in step 112 and contact or pressing on the touch screen is detected in step 114. A timer determines in step 116 if the time duration of the surface contact is greater than a minimum time duration which minimum time contact is interpreted as a long press such as a finger or thumb press on the surface and if the time is greater than or equal to the minimum time considered for a long press, a confirmation message is shown on the display screen in step 118 that the touch screen is locked and in step 120 that the touch screen and keypad lock is active. Upon removal or lifting, for example, of the thumb from the touch screen surface such that no touch screen contact is detected in step 122, a timer is started and counts for a predetermined time in step 124. During the time interval count in step 124, it is determined if contact with the touch screen has not occurred and if no touch screen contact is detected then the touch screen becomes active and a confirmation message is displayed in step 128 with the touch screen and keypad lock being deactivated in step 130. The user then ends the ongoing call in step 132 returning to the previous state (that is, state before the call occurred with the touch screen and keypad lock active).

Figure 5:
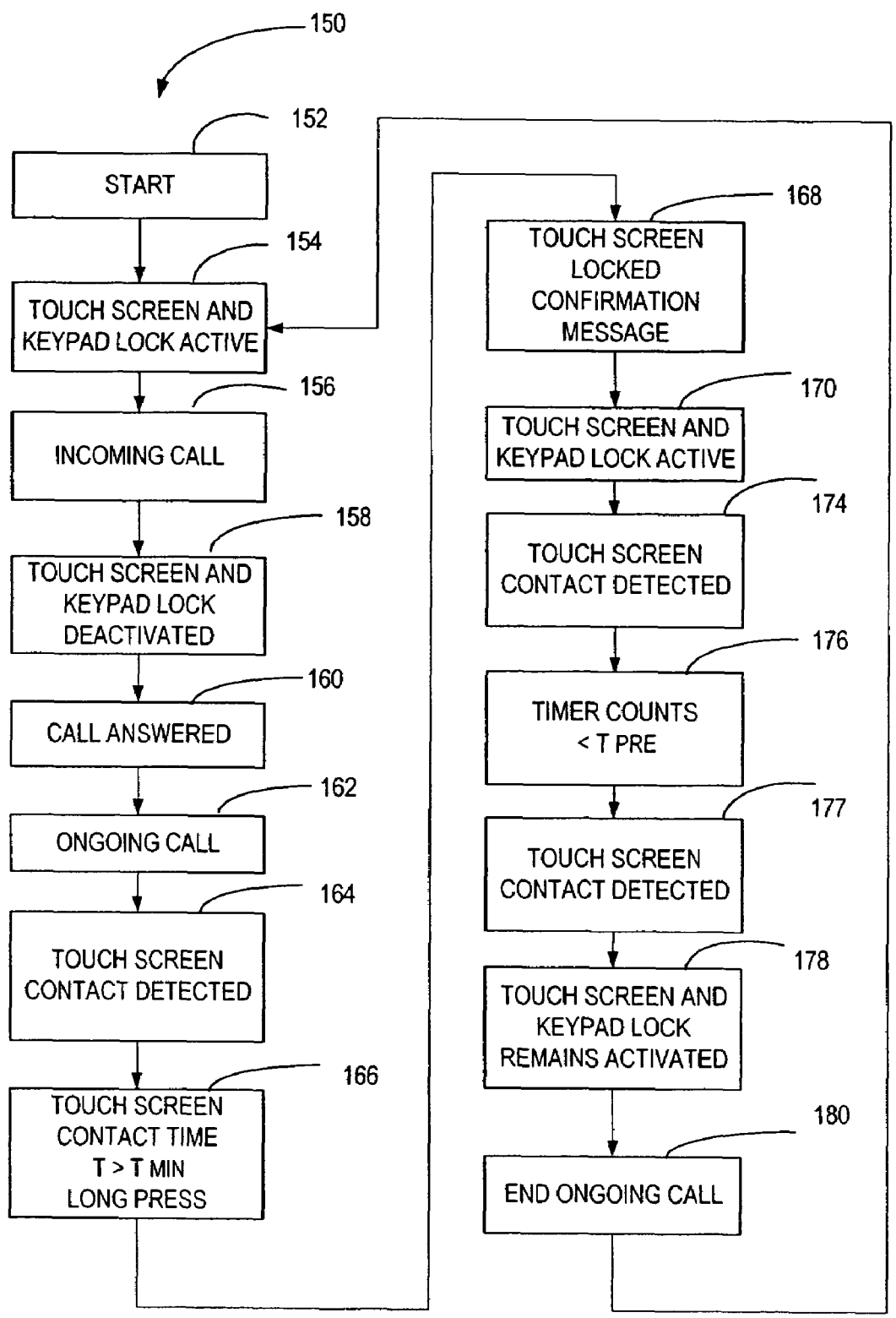
FIG. 5 is a flowchart showing another sequence of the method of the present invention for activating and deactivating the touch screen lock during an ongoing call.

Turning now to FIG. 5, a flowchart generally designated 150 is illustrated therein showing another sequence of the method of the present invention for activating and deactivating the touch screen and keypad lock during an ongoing call and begins with the start step 152 and the touch screen and keypad lock is active as indicated in step 154 until receipt of an incoming call as designated in step 156 which causes in step 158 the touch screen and keypad lock to become deactivated to allow the call to be answered in step 160 and an ongoing call to be established in step 162. Again, contact is made with the touch screen surface and detected in 164. If the touch screen contact time duration interval is greater than or equal to a minimum time duration interval, it is interpreted as a long press in step 166 and a confirmation message that the touch screen is locked is shown on the touch screen display in step 168. The user is also alerted that the touch screen and keypad lock is active in step 170. A timer is started upon detection that the user's thumb or finger has been lifted from the touch screen surface in step 174. The timer counts for a predetermined time interval during which contact with the touch screen, for example, accidental touching at a given time occurs in step 177 such that the contact occurs before the timer has counted to the predetermined count in step 176, the touch screen and keypad lock remains activated as shown in step 178 during the ongoing call such that further accidental contact will not cause the unintended operation of phone features and functions. The ongoing call is ended in step 180 and the mobile phone automatically returns to the previous state, that is, the state before the call occurred with the touch screen and keypad lock active.

Figure 6:
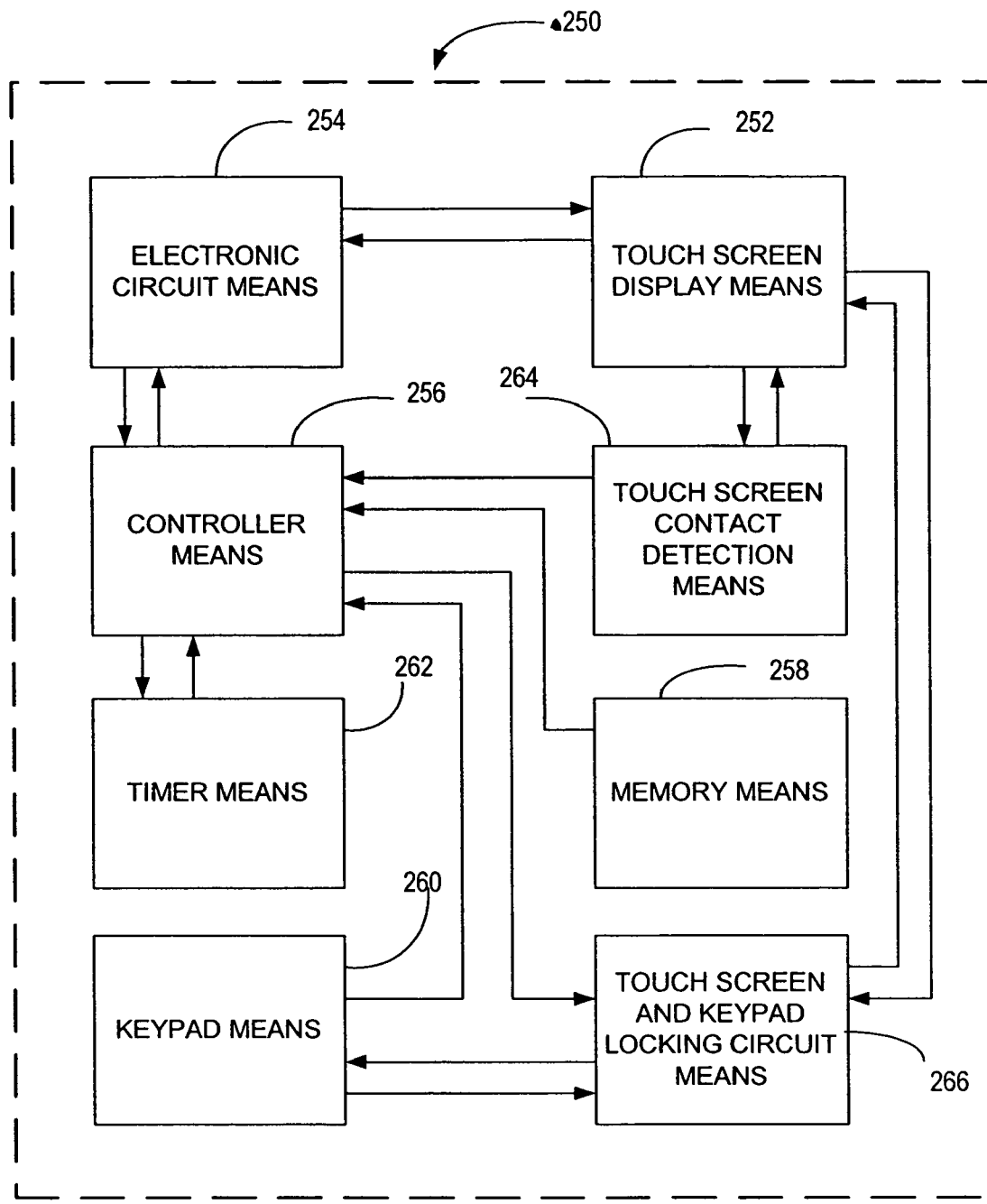
FIG. 6 is a schematic functional block diagram showing the major functional components of the touch screen mobile phone embodying the present invention.

Turning now to FIG. 6, a schematic functional block diagram showing the major functional components of the touch screen mobile phone embodying the present invention is illustrated therein and generally designated 250. A suitable touch screen display means such as film-on-glass or other touch screen display technologies well known to those skilled in the art is provided and generally designated 252. Electronic circuit means 254 appropriate for carrying out the functions of the mobile phone is provided. A controller circuit means 256 which may be part of the electronic circuit means 254 but for purposes of explanation is shown as a separate functional element in FIG. 6, cooperates with an instruction set contained within a memory means 258 and a keypad means 260 for input and function selection. Timer means 262 also cooperates with the controller means 256 to carry out various timing functions in accordance with the instruction set retrieved from the memory means 258 via the controller 256. Detection means generally designated 264 are provided to detect contact with the surface of the touch screen display means 252. The detection means 264 cooperates with the controller means 256. A touch screen and keypad locking circuit means 266 is responsive to the controller means 256 for activating and deactivating the keypad means 260 and touch screen display means 252. The keypad means 260 contemplates all the keys found on the mobile phone. The operation and interconnection of the major functional elements of the mobile phone are well known to those skilled in the art and may be of any appropriate design to carry out the intended functions.

A mobile phone having a touch screen display and associated method for activating and deactivating the touch screen lock in the mobile phone during an ongoing call has been described above in several preferred embodiments. Numerous changes and modifications may be made by those skilled in the art without departing from the spirit and scope of the present invention, for example, the device may not have a physical keypad 44 and keys 46, 46 but may have a virtual keypad and keys shown on the touch screen display and operated by contact with the corresponding position on the touch screen surface. It will also be recognized that activating and deactivating the touch screen lock to lock and unlock the touch screen can also be extended to locking and unlocking the physical and/or virtual keys when the touch screen is locked and unlocked. Therefore, the invention has been presented by way of illustration rather than limitation.

What is claimed is:

1. Apparatus, comprising:
   a mobile phone configured and arranged with a touch screen display for selectively operating a desired phone function or ending the operation of said ongoing phone function in response to a pressing contact on the touch screen display surface;
   a touch screen lock for deactivating the pressing contact operation of said touch screen display during an ongoing call, and
   a contact determining mechanism for detecting the presence or absence of a pressing contact on the touch screen display responsive to a first long pressing contact on any location along the touch screen display surface, said long pressing contact being defined as a pressing contact greater than or equal to a first predetermined time interval duration, for activating said touch screen lock to disable the pressing contact operation of said touch screen display during the ongoing call such that the mobile phone is placed in an operative state that is non-responsive to a pressing contact on the touch screen display surface, and responsive to an absence of a pressing contact on any location along the touch screen display surface during the ongoing call within a second predetermined time interval duration measured from the end of said first long pressing contact for deactivating said touch screen lock to enable the pressing contact operation of said touch screen display such that the mobile phone is placed in an operative state that is responsive to a pressing contact on the touch screen display surface to operate a desired phone function or end the ongoing call.

2. Apparatus as defined in claim 1 further including means for indicating that said touch screen lock is activated or deactivated.

3. Apparatus as defined in claim 2 wherein a message is shown on the touch screen display indicating that said touch screen lock is in an activated mode.

4. Apparatus as defined in claim 2 wherein a closed lock icon is shown on the touch screen display indicating that said touch screen lock is in an activated mode.

5. Apparatus as defined in claim 2 wherein a message is shown on the touch screen display indicating said touch screen lock is in a deactivated mode.

6. Apparatus as defined in claim 2 wherein an open lock icon is shown on the touch screen display indicating that said touch screen lock is in a deactivated mode.

7. The apparatus as defined in claim 1 wherein said contact determining mechanism is further responsive to a pressing contact within a third predetermined time interval duration of less duration than said second predetermined time interval duration as measured from the end of said first long pressing contact to maintain said touch screen lock in an active state.

8. Method, comprising:
   a touch screen display responding to a pressing contact on the touch screen display surface for selectively operating a desired phone function or ending the operation of an ongoing phone function in a mobile phone;
   activating a touch screen lock for deactivating the pressing contact operation of the touch screen display during an ongoing call by detecting the presence or absence of a pressing contact on the touch screen display and responding to a long pressing contact on any location along the touch screen display surface to disable the pressing contact operation of the touch screen display such that the mobile phone is in an operative state that is non-responsive to a pressing contact on the touch screen display surface, and responding to the absence of a pressing contact on any location along the touch screen display surface during the ongoing call within a predetermined time interval duration measured from the end of the long pressing contact for deactivating the touch screen lock to enable the pressing contact operation of the touch screen display such that the mobile phone is in an operative state that is responsive to a pressing contact on the touch screen display surface.

9. The method as defined in claim 8 wherein the long pressing contact with the touch screen display surface is greater than or equal to a first predetermined time interval duration.

10. The method as defined in claim 9 further comprising:

detecting a pressing contact with the surface of the touch screen display within a third predetermined time interval duration of less duration than the second predetermined time interval duration as measured from the end of the long pressing contact for maintaining the touch screen lock in an activated mode in response to the detection of contact with the touch screen surface during the second predetermined time interval duration.

* * * * *